(12) United States Patent
Wakita et al.

(10) Patent No.: US 7,749,653 B2
(45) Date of Patent: Jul. 6, 2010

(54) LITHIUM ION BATTERY

(75) Inventors: Shinya Wakita, Fukushima (JP); Izaya Okae, Fukushima (JP)

(73) Assignee: Sony Corporation, Tokyo (JP)

( * ) Notice: Subject to any disclaimer, the term of this patent is extended or adjusted under 35 U.S.C. 154(b) by 485 days.

(21) Appl. No.: 11/743,428

(22) Filed: May 2, 2007

(65) Prior Publication Data

US 2007/0264575 A1 Nov. 15, 2007

(30) Foreign Application Priority Data

May 15, 2006 (JP) .............................. 2006-135668

(51) Int. Cl.
*H01M 4/48* (2010.01)
*H01M 4/62* (2006.01)

(52) U.S. Cl. ..................... 429/209; 429/231.4; 429/232

(58) Field of Classification Search ................. 429/209, 429/231.4, 231.5, 232
See application file for complete search history.

(56) References Cited

U.S. PATENT DOCUMENTS 6,165,647 A * 12/2000 Watanabe et al. ..... 429/231.8 X
7,094,499 B1 * 8/2006 Hung ....................... 429/231.8
2004/0121234 A1 * 6/2004 Le ............................ 429/231.1

FOREIGN PATENT DOCUMENTS

| JP | 09-204936 | 8/1997 |
|---|---|---|
| JP | 9204936 | 8/1997 |
| JP | 09-283183 | 10/1997 |
| JP | 10255807 | 9/1998 |
| JP | 2965450 | 8/1999 |
| JP | 2001-126766 | 5/2001 |
| JP | 3223523 | 8/2001 |
| JP | 3371301 | 11/2002 |
| JP | 2004-200176 | 7/2004 |
| JP | 2004-214182 | 7/2004 |

* cited by examiner

*Primary Examiner*—Stephen J. Kalafut
(74) *Attorney, Agent, or Firm*—K&L Gates LLP (57) ABSTRACT

A battery is provided. In the battery including a cathode, an anode having an anode active material layer provided on an anode current collector, said anode active material layer containing a carbon material as an anode active material, and an electrolyte solution, the anode active material layer contains nano-particles of ceramic. The battery limits the precipitation of lithium on the surface of the anode, improves energy density and has an excellent cycle characteristics.

7 Claims, 2 Drawing Sheets

LITHIUM ION BATTERY

CROSS REFERENCES TO RELATED APPLICATIONS

The present application claims priority to Japanese Patent Application JP 2006-135668 filed on May 15, 2006, the entire contents of which is being incorporated herein by reference.

BACKGROUND

The present application relates to a lithium ion battery using, for example, a carbon material as the anode.

The significant development of portable electronic technologies in recent years has permitted of the recognition of electronic devices such as portable telephones, laptop computers and personal digital assistants (PDAs) as fundamental technologies supporting a high degree of information-oriented society. Also, research and developments concerning high functionalization of these devices are being energetically made, and the power consumption of electronic devices is steadily increasing in proportion to this. On the other hand, it is demanded of these electronic devices to work for a long time and it has been inevitably desired to develop secondary batteries having a high energy density which are driving power sources.

The energy density of a battery provided within an electronic device is preferably higher from the viewpoint of the occupied volume and weight of the battery. In order to cope with this demand, there is a proposal of a secondary battery using lithium Li as an electrode reactive material. Among these secondary batteries, a lithium ion secondary battery using a carbon material that can be doped or dedoped with a lithium ion as the anode has come to be provided within almost all devices because it has a high energy density.

However, such a battery has been already utilized for charging or discharging up to a range close to the theoretical capacity of a carbon material. For this, studies as to measures taken to raise energy density are being made to increase the thickness of an active material layer, thereby increasing the ratio of the active material layer and decreasing the ratio of a current collector and a separator as shown in Japanese Patent Application Laid-Open (JP-A) No. 9-204936.

However, the diffusion of lithium ions in the anode is insufficient in batteries improved in energy density and therefore, measures taken to improve the diffusion of lithium ions are strongly desired. In the case of, particularly, increasing the thickness of the active material layer, the area of the electrode is decreased because the length of the electrode is decreased to manufacture a battery having the same size. Therefore, these batteries have the problem that the charge density loaded on the anode is more increased during charging than in the case of batteries in related art and the diffusion of lithium and electric acceptance of lithium in the anode is unable to catch up with the increase in charging density, with the result that a lithium metal tends to precipitate. The precipitated lithium metal tends to peel off or fall down, leading to a reduction in active material, which results in significantly deteriorated cycle characteristics. It is therefore difficult to increase the thickness of the active material layer.

In light of this, there is a proposal concerning a lithium ion secondary battery improved in the diffusibility of lithium in an anode by mixing ceramic particles in the anode as shown in JP-A No. 10-255807.

In JP-A No. 10-255807, the internal resistance of the electrode is reduced by mixing ceramic having high ion conductivity in the anode to thereby obtain a lithium ion secondary battery having a high capacity. Also, the strength of the electrode can be improved at the same time and it is therefore possible to improve cycle characteristics. In JP-A No. 10-255807, there is the description that the performance of the battery can be improved by compounding the above ceramic in an amount of 0.01 to 20 parts by weight for 100 parts by weight of the anode active material. At this time, ceramic having 10 μm or less is used as the above ceramic.

When ceramic is mixed in the anode as shown in JP-A-No. 10-255807, there is a fear that no ion diffusing effect is obtained if the particle diameter of the ceramic to be mixed is too large in a lithium ion battery using an electrolyte solution containing an organic solvent. Also, there is a fear that the diffusion of ions is hindered.

Generally, in lithium ion batteries, a part of the electrolyte solution is dissolved when they are charged in the initial charging, whereby an organic SEI (Solid Electrolyte of Interface) film is formed on the surface of the anode active material. This organic SEI film causes a rise in the interfacial resistance of the anode active material to thereby hinder the diffusion of ions. In order to solve this problem, ceramic particles are mixed in an anode to form an anode active material layer. It is therefore possible to form a complex SEI film increased in ion diffusibility which is provided with not only the organic SEI film but also an organic SEI film having high ion diffusibility in which ceramic besides the organic SEI film is stuck to the surface of the anode active material. In such a complex SEI film, lithium ions can be moved at a high rate on the surface of ceramic in the film and it is therefore possible to improve the diffusibility of ions on the surface of the anode active material.

However, the organic SEI film formed on the surface of anode active material has a thickness of about several nm. Therefore, when ceramic having a large particle diameter is mixed, the ceramic surface facing the electrolyte solution is increased resultantly. Because the ionic diffusibility of the surface of ceramic is lower than that of the electrolyte solution, there is a fear that the diffusion of ions is hindered if the particle diameter of ceramic is too large. Also, the surface area of ceramic which contributes to ionic diffusion in the complex SEI film is so reduced that the effect of improving the ionic diffusibility on the surface of the anode active material is reduced, with the result that it is difficult to limit the precipitation of lithium.

SUMMARY

It is therefore desired to solve the aforementioned problem and to provide a lithium ion battery having a high energy density and excellent cycle characteristics.

According to an embodiment, there is provided a lithium ion battery including a cathode, an anode having an anode active material layer provided on an anode current collector, said anode active material layer containing a carbon material as an anode active material, and an electrolyte solution, wherein the anode active material layer contains nano-particles of ceramic.

Since it is so devised that the anode is made to contain ceramic nano-particles having a median diameter less than 1 μm, a SEI film containing ceramic having a small median diameter is formed on the surface of the anode active material and the SEI film having high resistance can be reformed to one superior in ionic diffusibility. Therefore, the diffusion and acceptance of lithium can be improved even if the thickness of the anode active material layer is increased and the volume density is increased.

According to the embodiment, a lithium ion battery that limits the precipitation of lithium on the surface of the anode, improves energy density and has excellent cycle characteristics can be obtained.

Additional features and advantages are described herein, and will be apparent from, the following Detailed Description and the figures.

DETAILED DESCRIPTION

The present application will be described in greater detail with reference to the drawings according to an embodiment.

Figure 1:
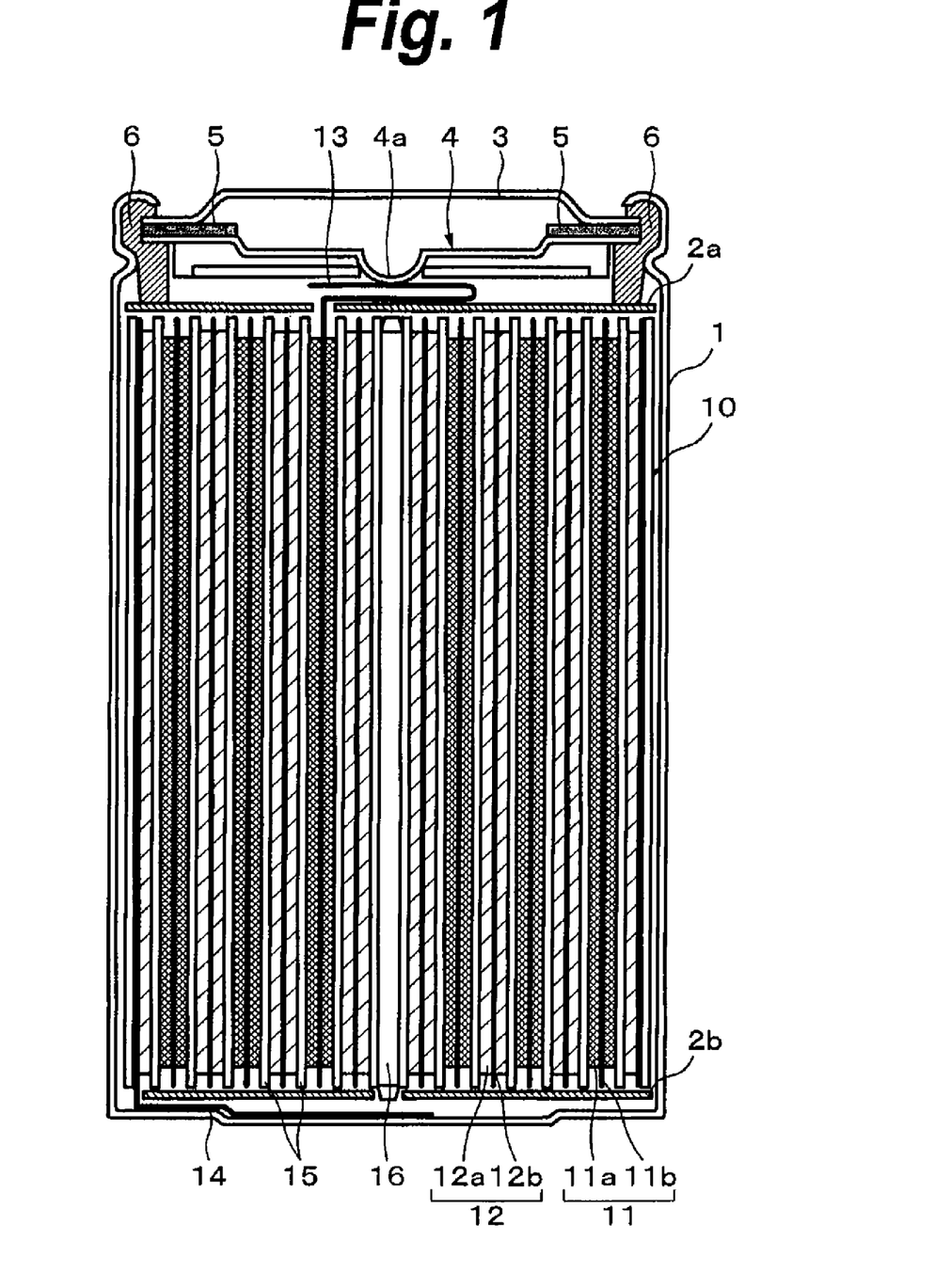
FIG. 1 is a sectional view showing an embodiment of a lithium ion battery according to an embodiment.

FIG. 1 is an example of a sectional view of a lithium ion secondary battery according to an embodiment. The battery is one called a cylinder type and is provided with a cell element 10 obtained by winding band-like cathode 11 and anode 12 through a separator 15 in a battery can 1 having an almost hollow cylindrical form. The battery can 1 is, for example, constituted of iron plated with nickel, and one of the ends thereof is closed and the other is opened. A pair of insulation plates 2a and 2b are disposed perpendicular to the winding peripheral surface in such a manner as to sandwich the cell element 10 inside of the battery can 1.

Examples of the material of the battery can 1 include iron Fe, nickel Ni, stainless SUS, aluminum Al and titanium Ti. This battery can 1 may be, for example, plated with nickel to prevent electrochemical corrosion caused by the nonaqueous electrolyte solution along with charging and discharging of the battery. A battery lid 3, a safety valve mechanism 4 disposed on the inner side of the battery lid 3 and a positive temperature coefficient (PTC) element 5 are fitted to the open end of the battery can 1 by caulking these parts through an insulation sealing gasket 6 and the inside of the battery can 1 is sealed. The battery lid 3 is made of, for example, the same material that is used for the battery can 1. The safety valve mechanism 4 is so devised that it is electrically connected with the battery lid 3 through the PTC element 5, and when the internal pressure of the battery is raised to a fixed value or more by a development of internal short circuits or heating from the outside, a disk plate 4a is reversed to cut off the electrical connection between the battery lid 3 and the cell element 10. The PTC element 5 serves as an element that limit the amount of current by an increase in resistance associated with a rise in temperature to thereby prevent abnormal generation of heat due to a large current, and it is made of barium titanate type semiconductor ceramics. The insulating sealing gasket 6 is made of, for example, an insulating material and the surface of the insulating material is coated with asphalt.

The cell element 10 is wound around a center pin 16. A cathode terminal 13 and an anode terminal 14 are connected to the cathode 11 and anode 14 of the cell element 10 respectively. The cathode terminal 13 is welded to the safety valve mechanism 4 to electrically connect to the battery lid 3 and the anode terminal 14 is welded to the battery can 1 to electrically connect to the battery can 1.

The structure of the battery element 10 stored in the battery can 1 will be explained.

(Cathode)

Figure 2:
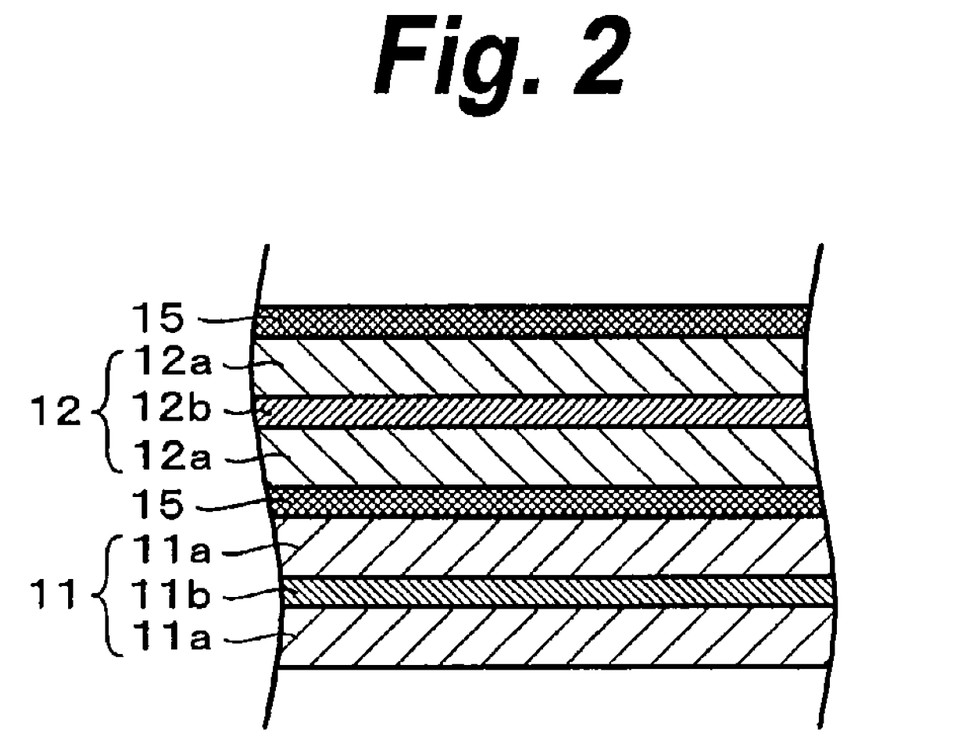
FIG. 2 is a sectional view showing an electrode of a lithium ion battery according to an embodiment.

The cathode 11 is obtained by forming a cathode active material layer 11a containing a cathode active material on both surfaces of the cathode current collector 11b. The cathode current collector 11b is constituted of a metal foil such as an aluminum foil, nickel foil, stainless foil or the like.

The cathode material layer 11a is formed by formulating, for example, a cathode active material, a conductive agent and a binder. It is only necessary that the cathode active material, conductive agent and binder are uniformly dispersed and there is no limitation to the mixing ratio of these materials.

As the cathode active material, a known cathode active material capable of occluding and releasing lithium ions may be used, and a metal oxide, metal sulfide or a specific polymer may be used according to the type of a battery to be intended. Examples of the cathode active material include lithium oxides, lithium sulfides, phase compounds containing lithium or lithium-containing compounds such as lithium phosphate compounds.

Among these compounds, preferable compounds are complex compounds containing lithium and a transition metal element as typified by $Li_xMO_2$ or $Li_xM_2O_4$ (where M represents one or more transition metals and x is generally given by the following equation: $0.05 \leq x \leq 1.10$, though depending on the charge or discharge condition of the battery) or phosphoric acid compounds typified by $Li_yMPO_4$ (where M represents one or more transition metals and y is generally given by the following equation: $0.05 \leq y \leq 1.10$). As the transition metals constituting these compounds, at least one kind of cobalt Co, nickel, manganese Mn, iron, aluminum, vanadium V and titanium Ti is selected.

Specific examples of the lithium complex oxide include lithium/cobalt complex oxides ($Li_xCoO_2$), lithium/nickel complex oxides ($Li_xNiO_2$), lithium/nickel/cobalt complex oxides ($Li_xNi_zCo_{1-z}O_2$) (wherein $z<1$)) and lithium/nickel/cobalt/manganese complex oxides ($Li_xNi_{z(1-v-w)}Co_vMn_wO_4$) (wherein $v+w<1$)).

Also, specific examples of the phosphoric acid compound include lithium-iron-phosphoric acid compounds ($LiFePO_4$) and lithium-iron-manganese-phosphoric acid compounds ($LiFe_{1-u}Mn_{1-u}PO_4$ (wherein $u<1$)). Such compounds can generate high voltage by using it as the cathode active material, are superior in energy density and are therefore preferable materials.

Moreover, other metal compounds or polymer materials are exemplified. Examples of the above other metal compound include oxides such as titanium oxide, vanadium oxide and manganese dioxide and disulfides such as titanium sulfide and molybdenum sulfide. Examples of the polymer material include polyanilines and polythiophenes.

As the cathode material, the aforementioned cathode active materials may be used in combinations of two or more.

As the conductive agent, one or two or more of carbon materials such as graphite, carbon black, ketchen black or graphite may be used singly or in combinations of two or more, though any material may be used without any particular limitation insofar as it may be mixed in the cathode material in a proper amount to impart conductivity. Also, besides carbon materials, metal materials or conductive polymer materials may be used insofar as they have conductivity.

Preferable examples of the binder include fluorine type polymers such as polyvinyl fluoride, polyvinylidene fluoride and polytetrafluoroethylene and synthetic rubbers such as styrenebutadiene type rubbers, fluorine type rubbers and ethylenepropylenediene rubbers, though known binders used usually for the cathode binder of batteries of this type. These binder materials may be used either singly or in combinations of two or more.

(Anode)

The anode 12 is obtained by forming the anode active material layer 12a containing an anode active material on both or one surface of the anode current collector 12b. The anode current collector 12b is made of a metal foil such as a copper foil, nickel foil, stainless foil or the like.

The anode active material layer 12a is formed by compounding an anode active material, ceramic nano-particles, and as required, a conductive agent and a binder. There is no limitation to the mixing ratio of the anode active material, conductive agent, binder and solvent like the cathode active material.

As the above ceramic, for example, inorganic oxides are used. Specifically, $Al_2O_3$, $SiO_2$, $ZrO_2$, $MgO$, $Na_2O$, $TiO_2$ or the like may be used and particularly, $Al_2O_3$ is preferable. This is because lithium ions are highly diffusive on the surface of $Al_2O_3$ particles. These inorganic oxides may be used either singly or in combinations of two or more. As the ceramic like this, for example, nano-particles having a median diameter less than 1 μm are used. Also, nano-particles having a median diameter of 100 nm or less are preferable and nano-particles having a median diameter of 15 nm or less are more preferable. It is to be noted that the median diameter is a particle diameter at an accumulation of 50% obtained in a laser diffraction method (JIS Z8825-1).

This ensures that a part of the electrolyte solution is resolved in initial charging and a complex SEI film containing ceramic nano-particles is formed on the surface of the anode active material. This allows lithium ions to move on the surface of ceramic having high ionic diffusibility in the part of the film having a high resistance and it is therefore possible to improve ionic diffusibility on the surface of the anode active material where the diffusion of ions is hindered.

The reason why the nano-particles of ceramic are used is that in the case of using ceramic having a median diameter of 1 μm or more, the diffusibility of ions in the complex SEI film can be insufficiently improved. Because the film formed on the surface of the anode active material has a thickness of about several nm, the surface of ceramic facing the electrolyte solution is increased when ceramic having a median diameter of 1 μm or more is mixed. Because ionic diffusibility on the surface of ceramic is lower than that of the electrolyte solution, there is a fear that the diffusion of ions is hindered if the particle diameter of the ceramic is excessively large. Also, the surface area of ceramic contributing the diffusion of ions in the complex SEI film is reduced and therefore, the effect of improving ionic diffusibility on the surface of the anode active material is reduced, with the result that it is difficult to restrict the precipitation of lithium.

Also, as the ceramic, one having a median diameter of preferably 100 nm or less and more preferably 15 nm or less is used. A reduction in the particle diameter of the ceramic makes it possible to form a complex SEI film superior in ionic diffusibility.

As the anode active material, a carbon material which can be doped or dedoped with lithium is used. Specifically, examples of the carbon material which can be doped or dedoped with lithium include graphite, not-easily-graphitizable carbon material, easily-graphitizable carbon material and highly crystalline carbon material having a developed crystal structure. More specifically, carbon materials such as thermally decomposed carbons, cokes (pitch cokes, needle cokes and petroleum cokes), graphite, glassy carbons, organic high-molecular compound baked bodies (those obtained by baking and carbonizing phenol resins, furan resins or the like at proper temperatures), carbon fibers and activated carbon may be used.

Particularly, it is preferable to use mesophase spherules. The reason is that because the graphite layer in the particle is oriented radially and the hardness of the particles is high, the active material in the vicinity of the surface of the electrode is scarcely crushed even if the electrode is press-molded, so that the orientation of the graphite layer is maintained in the direction of the thickness of the electrode, which allows the graphite layer to have the excellent ability to accept lithium ions. These mesophase spherules belong to the so-called easily-graphitizable carbons and are liquid crystal spherules generated as an intermediate in a system in which the phase participating in the reaction is changed from a liquid phase to a solid phase when the organic compound is heat-treated.

In order to obtain this mesophase spherules, coal or petroleum pitches such as coal tar pitch is heat-treated at 400° C. to 500° C. in an inert atmosphere to produce liquid crystal spherules, which are separated from the pitch matrix as a quinoline insoluble content. After that, the grain size is adjusted by crushing or classification according to the need.

These carbon materials are very reduced in the change of the crystal structure produced in charging or discharging and it is possible to obtain not only a high charging and discharging capacity but also good charging and discharging cycle characteristics and are therefore preferable. Particularly, graphite has high electrochemical equivalent and can obtain a high energy density and is preferable. The above graphite may be either natural graphite or artificial graphite.

As the above graphite, those having the following characteristics are preferable: lattice spacing $d_{002}$ in the direction of the C axis in X-ray diffraction is 0.338 nm or less, and the peak strength ratio ($I_D/I_G$) exceeds 0.01 and 2.0 or less when the strength of a peak present in a wavelength region from 1570 cm$^{-1}$ or more and 1630 cm$^{-1}$ or less is $I_G$ and the strength of a peak present in a wavelength region from 1350 cm$^{-1}$ or more and 1370 cm$^{-1}$ or less is $I_D$ in a Raman spectrum using an argon laser having a wavelength of 514.5 nm is used. The lattice spacing $d_{002}$ can be measured by an X-ray diffraction method (Sugio OTANI et al., Carbon Fibers, pp 733-742 (1986), published by Kindai Henshu) using a CuKα ray as the X ray and high purity silicon as the standard material. Also, the true density of the graphite is preferably 2.10 g/cm$^3$ or more and more preferably 2.18 g/cm$^3$ or more.

Moreover, it is preferable that the bulk density of the graphite be 1.2 g/cm$^3$ or more and the breaking strength of the graphite 50 MPa or more. This is because the layer structure of the graphite can be maintained and the lithium occlusion and releasing reaction can be kept smoothly even if the anode active material 12a is pressed to increase the volume density thereof. The breaking strength of graphite particles can be found from the following equation.

$$St(Sx)=2.8P/(\pi \times d \times d)$$

Here, St (Sx) represents a breaking strength [Pa], P represents a power [N] applied in the test and d denotes the median diameter [mm] of particles. In this case, the median diameter d may be measured, for example, by a laser diffraction type grain distribution measuring device.

As the not-easily-graphitizable carbon material, those having the following characteristics are preferable: the spacing of the (002) plane is 0.37 nm or more, true density is less than 1.70 g/cm$^3$ and no exothermic peak is shown at 700° C. or more in differential thermal analysis (DTA) in the air.

As the binder and the solvent, the same ones that are used for the cathode may be used.

(Electrolyte Solution)

The nonaqueous electrolyte solution is prepared, for example, by appropriately combining an organic solvent and an electrolyte salt. As the organic solvent, any material generally used in this type of battery may be used. Examples of the organic solvent include room temperature molten salts such as 4-fluoro-1,3-dioxolan-2-one, ethylene carbonate, propylene carbonate, vinylene carbonate, dimethyl carbonate, ethylmethyl carbonate, γ-butyrolactone, γ-valerolactone, 1,2-dimethoxyethane, 1,2-diethoxyethane, tetrahydrofuran, 2-methyltetrahydrofuran, 1,3-dioxolan, 4-methyl-1,3-dioxolan, diethyl ether, methyl acetate, methyl propionate, ethyl propionate, acetonitrile propionate, propionitrile, anisole, ester acetate, ester butyrate, glutaronitrile, adiponitrile, methoxyacetonitrile, 3-methoxypropylonitrile, N,N-dimethylformamide, N-methylpyrrolidinone, N-methyloxazolidinone, nitromethane, nitroethane, sulfolane, methylsulfolane, dimethyl sulfoxide, trimethyl phosphate, triethyl phosphate, ethylene sulfite and bistrifluoromethylsulfonylimidotrimethylhexylammonium. Among these compounds, at least one kind selected from the group consisting of 4-fluoro-1,3-dioxolan-2-one, ethylene carbonate, propylene carbonate, vinylene carbonate, dimethyl carbonate, ethylmethyl carbonate and ethylene sulfite is preferably mixed for obtaining excellent charging or discharging capacity characteristics and charging and discharging cycle characteristics.

As the above electrolyte salt, one dissolved in the above organic solvent is used and the electrolyte salt is produced by combining a cation with an anion. As the cation, an alkali metal or an alkali earth metal is used and as the anion, $Cl^-$, $Br^-$, $I^-$, $SCN^-$, $ClO_4^-$, $BF_4^-$, $PF_6^-$, $CF_3SO_3^-$ or the like is used. Specific examples of the electrolyte salt include lithium chloride LiCl, lithium perchlorate $LiClO_4$, lithium hexafluoroarsenate $LiAsF_6$, lithium hexafluorophosphate $LiPF_6$, lithium tetrafluoroborate $LiBF_4$, lithium tetraphenylborate $LiB(C_6H_5)_4$, lithium methanesulfonate $LiCH_3SO_3$, lithium trifluoromethanesulfonate $LiCF_3SO_3$, bis(pentafluoroethanesulfonyl)imidolithium $Li(C_2F_5SO_2)_2N$, bis(trifluoromethanesulfonyl)imidolithium $Li(CF_3SO_2)_2N$, tris(trifluoromethanesulfonyl)methyllithium $LiC(CF_3SO_2)_3$ and lithium bromide LiBr. These compounds may be used either singly or in combinations of two or more. Among these compounds, it is preferable to use $LiPF_6$ mainly.

(Separator)

The separator 15 is produced, for example, by using a porous film made of a polyolefin type material such as polypropylene PP or polyethylene PE or a porous film made of an inorganic material such as ceramic nonwoven fabric. The separator 15 may have a structure in which two or more porous films are laminated. Among these compounds, a porous film such as polyethylene or polypropylene is most effective.

Generally, as to the thickness of the separator 15, a separator having a thickness of preferably 5 μm or more and 50 μm or less and more preferably 7 μm or more and 30 μm or less may be used. If the separator 15 is too thick, the amount of the active material to be filled is decreased, leading not only to a reduction in battery capacity but also to a reduction in ionic conductivity, resulting in deteriorated current characteristics. If the separator 15 is too thin on the other hand, the mechanical strength of the film is dropped.

Next, one example of a method of producing a lithium ion secondary battery having the above structure will be explained.

(Production of a Cathode)

The foregoing cathode active material, binder and conductive agent are uniformly mixed to form a cathode combined agent. This cathode combined agent is dispersed in a solvent such as N-methyl-2-pyrrolidone and is made into a slurry by using a ball mill, sand mill, biaxial kneader or the like according to the need. Then, this slurry is uniformly applied to both surfaces of the cathode current collector 11b by a doctor blade method or the like. Moreover, the cathode current collector is dried at high temperatures to remove a solvent and then compression-molded by a roll press machine or the like to form a cathode material layer 11a. At this time, the cathode active material layer 11b may be formed by applying the cathode combined agent to the cathode current collector 11b.

Any of inorganic solvents and organic solvents may be used as the solvent without any particular limitation insofar as it is inert to the electrode material and can dissolve the binder.

Also, no particular limitation is imposed on the coating apparatus and a slide coater, extrusion-type die coater, reverse roller, gravure coater, knife coater, kiss coater, micro-gravure coater, rod coater or blade coater may be used. Also, though no particular limitation to the drying method, natural drying, air drying, hot air drying, infrared heater, far-infrared heater or the like may be used.

One cathode terminal 13 connected by spot welding or ultrasonic welding is deposited on one end of the cathode 11. This cathode terminal 13 is preferably a metal foil or network. However, any material may be used as the cathode terminal 13 without any problem even if it is not a metal insofar as it is stable electrochemically and chemically and is allowed to conduct. Examples of the material used for the cathode terminal 13 include Al. The cathode terminal 13 is so devised that it is deposited on the exposed part of the cathode current collector disposed at the end of the cathode 11.

(Production of an Anode)

The foregoing anode active material, binder and ceramic nano-particles are uniformly mixed to form an anode combined agent. This anode combined agent is dispersed in a solvent such as N-methyl-2-pyrrolidone and is made into a slurry. At this time, a ball mill, sand mill, biaxial kneader or the like may be used like the case of the cathode combined agent. Then, this slurry is uniformly applied to both surfaces of the anode current collector by a doctor blade method or the like. Moreover, the anode current collector is dried at high temperatures to remove a solvent and then compression-molded by a roll press machine or the like to form an anode active material layer 12a. At this time, like the case of the cathode, the anode active material layer 12a may be formed by applying the anode combined agent to the anode current collector 12b.

At this time, the thickness of the anode active material layer 12a is preferably 65 μm or more and 120 μm or less on one surface and a total of 130 μm or more and 240 μm or less on both surfaces, because particularly high ion diffusing effect is obtained when the thickness is in the above range. In this lithium ion secondary battery, the thickness of the anode active material layer 12a can be made larger than that of an anode active material used currently, by blending ceramic nano-particles in the anode. For this, the amount of lithium ions to be accepted is increased and also, the volumes of the cathode current collector 11b, anode current collector 12b and separator 15 are decreased in the battery, whereby energy density can be improved. However, when the anode active material layer 12a is made too thick, the effect of improving ionic diffusibility due to the blending of ceramic is scarcely obtained, so that the lithium charge accepting ability of the anode is reduced, which deteriorates battery characteristics such as heavy load characteristics and cycle characteristics. Also, when the anode active material layer 12a is too thin, the energy density is not improved.

Moreover, the volume density of the anode active material layer 12a is preferably in a range from 1.7 g/cm³ to 1.95 g/cm³ because a particularly high ionic diffusing effect is obtained in the above range. This reason is that when the volume density is too low, the amount of the active material that can be filled in the battery is reduced and therefore, the energy density can be insufficiently improved, whereas when the volume density is too high, the effect of improving ionic diffusibility due to the blending of ceramic is scarcely obtained, resulting in deteriorated battery characteristics.

It is to be noted that the foregoing thickness and volume density of the anode active material layer 12a are made to be those of the anode active material layer 12a formed on the anode current collector 12b in the anode production process and obtained after the compression molding.

Also, one anode terminal 14 is welded to one end of the anode 12 by spot welding or ultrasonic welding. Any material may be used as the anode terminal 14 without any problem even if it is not a metal insofar as it is stable electrochemically and chemically and is allowed to conduct. Examples of the material used for the anode terminal 14 include copper and nickel. It is so devised that the anode terminal 14 is deposited on the exposed part of the anode current collector formed at the end of the anode 12 in the same manner as in the case of the part where the cathode terminal is welded.

(Production of a Cell Element)

As shown in FIG. 2, the cathode 11, the anode 12 and the separator 15 are laminated in the order of the cathode 11, the separator 15, the anode 12 and the separator 15 and the resulting laminate is wound to make a cell element 10. Next, the end of the cathode terminal 13 is connected to the battery lid 3 with the built-in safety valve mechanism 4 and PTC element 5, by welding or the like and also, the cell element 10 is received in the battery can 1. At this time, the cell element 10 is received in such a manner that the lead-out side of the anode terminal 14 on the wound surface of the cell element 10 is covered with the insulating plate 2a made of an insulating resin. After that, one electrode bar is inserted from the center of the wound cell element, another electrode bar is disposed on the outside of the bottom of the battery can 1 to carry out resistance welding, and the anode terminal 14 is welded to the battery can 1. In this case, the cell element 10 may be received after the anode terminal 14 is first connected to the battery can 1.

After the anode terminal 14 is welded to the battery can 1, a center pin 16 is inserted, an insulating plate 2b is also disposed at the wound surface part located at the opening end of the battery can, and then, an electrolyte solution is poured to impregnate the separator with the electrolyte solution. In succession, the battery lid 3, the safety valve mechanism 4 and the PTC element 5 are fixed to the open end of the battery can 1 by caulking these parts through the insulation sealing gasket 6 and the inside of the battery can 1 is thereby sealed.

As the cathode terminal 13, it is necessary to use one having a certain length in view of the production process. This is because the opening end of the battery can is sealed after the cathode terminal 13 is connected with the safety valve mechanism 4 disposed on the battery lid 3 in advance. As the cathode terminal 13 is shorter, it is more difficult to connect the cathode terminal 13 with the battery lid 3. Therefore, the cathode terminal 13 is received in the battery in the condition that it is bent in an almost U-form.

Also, though the anode terminal 14 is connected with the battery can 1 to produce a lithium ion secondary battery in the above embodiment, the cathode terminal 13 may be connected with the battery can 1 to form a cathode can.

When the lithium ion secondary battery produced in the above manner is charged, for example, lithium ions are released from the cathode active material layer 11a and occluded in the anode active material layer 12a through the electrolyte solution. Also, when a discharge operation is carried out, for example, lithium ions are released from the anode active material layer 12a and occluded in the cathode active material layer 11a through the electrolyte solution. At this time, the area of the anode active material layer 12a is reduced and the density of current across the anode 12 during charging is increased because the anode active material layer 12a is thickened. However, nano-particles of ceramic are included in the anode and a good complex SEI film is formed on the anode 12, which improves the diffusion of lithium and electrochemical charge accepting ability at the anode 12, whereby the precipitation of a lithium metal at the anode 12 is limited.

The present application will be described in greater detail by way of examples according to various embodiments.

EXAMPLE 1

The type of ceramic to be contained in an anode was changed to produce lithium ion secondary batteries and the capacity retaining factor of each battery after 100 cycles was measured.

Example 1-1

Production of a Cathode

A cylindrical secondary battery as shown in FIG. 1 was produced. First, lithium carbonate $Li_2CO_3$ and cobalt carbonate $CoCO_3$ were mixed in the molar ratio, $Li_2CO_3$:$CoCO_3$=0.5:1 and the mixture was baked at 900° C. in the air for 5 hours to obtain a lithium/cobalt complex oxide $LiCoO_2$. The obtained $LiCoO_2$ was measured by X-ray diffraction, to find that its peak exactly accorded to the peak of $LiCoO_2$ registered in the JCPDS (Joint Committee of Powder Diffraction Standard) File. Next, this lithium/cobalt complex oxide is crushed into a powder having a particle diameter (median diameter) of 15 μm at an accumulation of 50% obtained in a laser diffraction method to obtain a cathode active material.

In succession, 95 parts by weight of this lithium/cobalt complex oxide powder and 5 parts by weight of a lithium carbonate powder $Li_2CO_3$ were mixed to form a cathode active material. Further, 94 parts by weight of this cathode material, 3 parts by weight of ketchen black as a conductor and 3 parts by weight of polyvinylidene fluoride as a binder were mixed. The mixture was dispersed in a solvent, N-methyl-2-pyrrolidone to make a cathode combined agent slurry. Then, this cathode combined agent slurry was applied uniformly to both surfaces of a cathode current collector made of a band-like aluminum foil having a thickness of 20 μm, followed by drying and compression-molding to form a cathode active material layer, thereby producing a cathode. At this time, the cathode active material layer on one surface had a thickness of 102 μm and a volume density of 3.53 g/cm³. Thereafter, an aluminum cathode terminal was fitted to one end of the cathode current collector.

(Production of an Anode)

90 parts by weight of a granular graphite powder made of mesophase spherules having a median diameter of 25 μm as an anode active material and 10 parts by weight of polyvinylidene fluoride (PVdF) as a binder were mixed to prepare an anode combined agent. Then, $Al_2O_3$ particles having a median diameter of 50 μm was simply mixed in the mixture in a ratio of 1.0 part by weight for 100 parts by weight of the granular graphite powder and the resulting mixture was dispersed in N-methyl-2-pyrrolidone as a solvent to prepare an anode combined agent slurry. Here, the properties of the graphite used as the anode active material were as follows: lattice spacing $d_{002}$ in the direction of the C-axis which was calculated by X-ray diffraction was 0.3363 nm, the ratio $(I_D/I_G)$ of peak strengths obtained by Raman spectrum using an argon laser having a wavelength of 514.5 nm was 0.3, bulk density was 1.50 g/cm$^3$ and breaking strength was 72 MPa. The breaking strength was measured by a small compression tester MCT-W500 manufactured by Shimadzu Corporation and found from the equation 1.

Next, this anode combined agent slurry was applied uniformly to both surfaces of an anode current collector made of a band-like copper foil having a thickness of 15 μm, followed by drying and compression molding to form an anode active material layer, thereby manufacturing an anode. At this time, the anode active material layer on one surface had a thickness of 90 μm and a volume density of 1.80 g/cm$^3$. Thereafter, a nickel anode terminal was fitted to one end of the anode current collector.

(Manufacturing of a Lithium Ion Secondary Battery)

After a cathode and an anode were manufactured, the cathode and the anode were provided alternately side by side through a separator as a laminate which was wound into a coil of many turns, thereby producing a cell element in which the cathode and the anode are facing each other through the separator consisting of porous oriented polyethylene film, of which thickness is 25 μm. Then, the cell element was sandwiched between a pair of insulating plates in such a manner that the wound surface of the cell element was covered with the insulating plates. The anode terminal is welded to a battery can and also, the cathode terminal was welded to a safety valve mechanism to receive the cell element in the battery can.

In succession, an electrolyte solution was poured into the battery can. As the electrolyte solution, an electrolyte solution was used which was obtained by dissolving lithium hexafluorophosphate in a ratio of 1.0 mol/kg as the electrolyte salt in a solvent prepared by blending vinylene carbonate VC, ethylene carbonate EC, diethyl carbonate DEC and propylene carbonate PC in a ratio by volume of 1:40:49:10.

Finally, a battery lid was fitted to the battery can by caulking through a gasket to manufacture a cylinder type lithium ion secondary battery.

Example 1-2

A lithium ion secondary battery was produced in the same manner as in Example 1-1 except that the ceramic particles to be contained were altered to SiO$_2$.

Example 1-3

A lithium ion secondary battery was produced in the same manner as in Example 1-1 except that the ceramic particles to be contained were altered to ZrO$_2$.

Example 1-4

A lithium ion secondary battery was produced in the same manner as in Example 1-1 except that the ceramic particles to be contained were altered to MgO.

Example 1-5

A lithium ion secondary battery was produced in the same manner as in Example 1-1 except that the ceramic particles to be contained were altered to Na$_2$O.

Example 1-6

A lithium ion secondary battery was produced in the same manner as in Example 1-1 except that the ceramic particles to be contained were altered to TiO$_2$.

Comparative Example 1-1

A lithium ion secondary battery was produced in the same manner as in Example 1-1 except that the ceramic particles were not contained.

(Measurement of Capacity Retaining Factor)

Each lithium ion secondary battery produced in Examples 1-1 to 1-6 and Comparative Example 1-1 was subjected to charge and discharge operations, to examine its capacity retaining factor after 100 cycles. First, the battery was charged under a fixed current of 1 C until the voltage of the battery reached 4.2 V, then the operation was changed to a charging operation carried out at a fixed voltage of 4.2 V and the charging operation was finished when the total charging time reached 4 hours. Then, a discharging operation of the battery was carried out under a fixed current of 1200 mA and finished when the voltage of the battery reached 3.0 V, to measure the discharge capacity in the first cycle.

In succession, a charge-discharge cycle in which the battery was charged until the voltage of the battery reached 4.2 V and discharged until the voltage of the battery reached 3.0 V was repeated 100 times in each Example and Comparative Example, to measure the capacity of the battery in 100th cycle, to find the capacity retaining factor after 100 cycles from the following equation: {(Battery capacity just after 100 cycles)/Battery capacity in the first cycle}×100.

The capacity retaining factor after 100 cycles in each Example and Comparative Example is shown in Table 1 below.

TABLE 1

As shown in Table 1, the capacity retaining factor was found while

| | CERAMIC | | | THICKNESS OF THE COATING FILM | | CAPACITY |
| --- | --- | --- | --- | --- | --- | --- |
| | TYPE | MEDIAN DIAMETER [nm] | CONTENT [PARTS BY WEIGHT] | ON ONE SURFACE OF THE ANODE [μm] | VOLUME DENSITY OF THE ANODE [g/cm$^3$] | RETAINING FACTOR AFTER 100 CYCLES[%] |
| EXAMPLE 1-1 | Al$_2$O$_3$ | 50 | 1.0 | 90 | 1.80 | 91 |
| EXAMPLE 1-2 | SiO$_2$ | 50 | 1.0 | 90 | 1.80 | 89 |

TABLE 1-continued

As shown in Table 1, the capacity retaining factor was found while

|  | CERAMIC | | | THICKNESS OF THE COATING FILM ON ONE SURFACE OF THE ANODE [μm] | VOLUME DENSITY OF THE ANODE [g/cm³] | CAPACITY RETAINING FACTOR AFTER 100 CYCLES[%] |
|---|---|---|---|---|---|---|
|  | TYPE | MEDIAN DIAMETER [nm] | CONTENT [PARTS BY WEIGHT] | | | |
| EXAMPLE 1-3 | $ZrO_2$ | 50 | 1.0 | 90 | 1.80 | 86 |
| EXAMPLE 1-4 | MgO | 50 | 1.0 | 90 | 1.80 | 87 |
| EXAMPLE 1-5 | $Na_2O$ | 50 | 1.0 | 90 | 1.80 | 85 |
| EXAMPLE 1-6 | $TiO_2$ | 50 | 1.0 | 90 | 1.80 | 90 |
| COMPARATIVE EXAMPLE 1-1 | — | — | 0 | 90 | 1.80 | 51 | changing the type of ceramic as shown in Examples 1-1 to 1-6. In the case of using any of nano-particles of ceramic such as $Al_2O_3$, $SiO_2$, $ZrO_2$, MgO, $Na_2O$, $TiO_2$ or the like, more significant improvement in capacity retaining factor than in the case of the lithium ion secondary battery containing no ceramic which was obtained in Comparative Example 1-1 was observed.

EXAMPLE 2

Using $Al_2O_3$ as the ceramic to be contained in the anode, the content of the ceramic to be contained in the anode was changed to produce lithium ion batteries and the capacity retaining factor of each battery after 100 cycles was measured.

Example 2-1

A lithium ion secondary battery was produced in the same manner as in Example 1-1 except that the content of $Al_2O_3$ particles was altered to 0.05 parts by weight for 100 parts by weight of the anode active material.

Example 2-2

A lithium ion secondary battery was produced in the same manner as in Example 1-1 except that the content of $Al_2O_3$ particles was altered to 0.1 parts by weight for 100 parts by weight of the anode active material.

Example 2-3

A lithium ion secondary battery was produced in the same manner as in Example 1-1.

Example 2-4

A lithium ion secondary battery was produced in the same manner as in Example 1-1 except that the content of $Al_2O_3$ particles was altered to 2.0 parts by weight for 100 parts by weight of the anode active material.

Example 2-5

A lithium ion secondary battery was produced in the same manner as in Example 1-1 except that the content of $Al_2O_3$ particles was altered to 3.0 parts by weight for 100 parts by weight of the anode active material.

Comparative Example 2-1

A lithium ion secondary battery was produced in the same manner as in Example 1-1 except that no $Al_2O_3$ particle was contained.

(Measurement of Capacity Retaining Factor)

Each lithium ion secondary battery produced in Examples 2-1 to 2-5 and Comparative Example 2-1 was subjected to charge and discharge operations, to examine its capacity retaining factors in the first cycle and 100th cycle by using the same method that was used in Example 1, to find the capacity retaining factor after 100 cycles.

The capacity retaining factor after 100 cycles in each Example and Comparative Example is shown in Table 2 below.

TABLE 2

|  | CERAMIC | | | THICKNESS OF THE COATING FILM ON ONE SURFACE OF THE ANODE [μm] | VOLUME DENSITY OF THE ANODE [g/cm³] | CAPACITY RETAINING FACTOR AFTER 100 CYCLES[%] |
|---|---|---|---|---|---|---|
|  | TYPE | MEDIAN DIAMETER [nm] | CONTENT [PARTS BY WEIGHT] | | | |
| EXAMPLE 2-1 | $Al_2O_3$ | 50 | 0.05 | 90 | 1.80 | 67 |
| EXAMPLE 2-2 | $Al_2O_3$ | 50 | 0.1 | 90 | 1.80 | 86 |
| EXAMPLE 2-3 | $Al_2O_3$ | 50 | 1.0 | 90 | 1.80 | 91 |
| EXAMPLE 2-4 | $Al_2O_3$ | 50 | 2.0 | 90 | 1.80 | 90 |
| EXAMPLE 2-5 | $Al_2O_3$ | 50 | 3.0 | 90 | 1.80 | 66 |
| COMPARATIVE EXAMPLE 2-1 | — | — | 0 | 90 | 1.80 | 51 |

As shown in Table 2, it is found that in the lithium ion secondary batteries increased in the thickness of the anode active material layer, Examples 2-1 to 2-5 containing $Al_2O_3$ are improved in capacity retaining factor than Comparative Example 1-1 containing no $Al_2O_3$. It is also found that particularly, Examples 2-2 to 2-4 in which the content of $Al_2O_3$ is 0.1 parts by weight or more and 2.0 parts by weight or less for 100 parts by weight of the anode active material is improved in capacity retaining factor.

On the other hand, though Examples 2-1 and 2-5 were found to be improved in capacity retaining factor, they were not found to have such a significant effect obtained in Examples 2-2 to 2-4. This is because Example 2 contains $Al_2O_3$ insufficiently, so that it can be improved in ion diffusibility insufficiently.

In the case of Example 2-5 on the other hand, the reason is that since the content of $Al_2O_3$ is excessive, the surface of the anode active material is coated with excessive $Al_2O_3$ particles having no influence on battery capacity and also $Al_2O_3$ is nano-level particles so that it much incorporates a binder, causing a reduction in the adhesive and binding strength required for the electrode.

It is found from the above results that a particularly significant effect is obtained when the content of $Al_2O_3$ is 0.1 parts by weight or more and 2.0 parts by weight or less.

Also, with regard to ceramics such as $SiO_2$, $ZrO_2$, $MgO$, $Na_2O$ and $TiO_2$ other than $Al_2O_3$, the content of each is likewise preferably in a range from 0.1 parts by weight to 2.0 parts by weight for 100 parts by weight of the anode active material.

EXAMPLE 3

Using $Al_2O_3$ as the ceramic to be contained in the anode, the median diameter of the ceramic to be contained in the anode was changed to produce lithium ion secondary batteries and the capacity retaining factor of each battery after 100 cycles was measured.

Example 3-1

A lithium ion secondary battery was produced in the same manner as in Example 1-1 except that the median diameter of $Al_2O_3$ particles was changed to 15 nm.

Example 3-2

A lithium ion secondary battery was produced in the same manner as in Example 1-1 except that the median diameter of $Al_2O_3$ particles was changed to 82 nm.

Example 3-3

A lithium ion secondary battery was produced in the same manner as in Example 1-1 except that the median diameter of $Al_2O_3$ particles was changed to 100 nm.

Example 3-4

A lithium ion secondary battery was produced in the same manner as in Example 1-1 except that the median diameter of $Al_2O_3$ particles was changed to 110 nm.

Example 3-5

A lithium ion secondary battery was produced in the same manner as in Example 1-1 except that the median diameter of $Al_2O_3$ particles was changed to 150 nm.

Example 3-6

A lithium ion secondary battery was produced in the same manner as in Example 1-1 except that the median diameter of $Al_2O_3$ particles was changed to 700 nm.

Comparative Example 3-1

A lithium ion secondary battery was produced in the same manner as in Example 1-1 except that the median diameter of $Al_2O_3$ particles was changed to 1000 nm.

(Measurement of Capacity Retaining Factor)

Each lithium ion secondary battery produced in Examples 3-1 to 3-6 and Comparative Example 3-1 was subjected to charge and discharge operations, to examine its capacity retaining factors in the first cycle and 100th cycle by using the same method that was used in Example 1, to find the capacity retaining factor after 100 cycles.

The capacity retaining factor after 100 cycles in each Example and Comparative Example is shown in Table 3 below.

TABLE 3

| | | CERAMIC | | THICKNESS OF THE COATING FILM | | CAPACITY |
| --- | --- | --- | --- | --- | --- | --- |
| | TYPE | MEDIAN DIAMETER [nm] | CONTENT [PARTS BY WEIGHT] | ON ONE SURFACE OF THE ANODE [μm] | VOLUME DENSITY OF THE ANODE [g/cm$^3$] | RETAINING FACTOR AFTER 100 CYCLES[%] |
| EXAMPLE 3-1 | $Al_2O_3$ | 15 | 1.0 | 90 | 1.80 | 95 |
| EXAMPLE 3-2 | $Al_2O_3$ | 82 | 1.0 | 90 | 1.80 | 90 |
| EXAMPLE 3-3 | $Al_2O_3$ | 100 | 1.0 | 90 | 1.80 | 86 |
| EXAMPLE 3-4 | $Al_2O_3$ | 110 | 1.0 | 90 | 1.80 | 71 |
| EXAMPLE 3-5 | $Al_2O_3$ | 150 | 1.0 | 90 | 1.80 | 67 |
| EXAMPLE 3-6 | $Al_2O_3$ | 700 | 1.0 | 90 | 1.80 | 59 |
| COMPARATIVE EXAMPLE 3-1 | $Al_2O_3$ | 1000 | 1.0 | 90 | 1.80 | 22 |

As shown in Table 3, it is found that Examples 3-1 to 3-6 containing $Al_2O_3$ having a median diameter less than 1 μm (1000 nm) are more improved in capacity retaining factor than Comparative Example 3-1 using $Al_2O_3$ having a median diameter of 1 μm. Particularly, Examples 3-1 to 3-3 having a median diameter of 100 nm or less are significantly improved in capacity retaining factor. Also, when the median diameter is 15 nm or less as shown in the case of Example 3-1, a higher capacity retaining factor can be obtained.

Examples 3-4 to 3-6, in turn, were found to be improved in capacity retaining factor, such an effect obtained in Examples 3-1 to 3-3 was not found. This is because ionic diffusibility can be only insufficiently improved since the particle diameter of $Al_2O_3$ particles is large and therefore largely exceeds the thickness of the SEI film having a thickness of several nm, and thus the ionic diffusibility in the SEI film is not sufficiently improved. Also, large $Al_2O_3$ particles which are insulating materials exist between the active material particles, bringing about a reduction in electroconductivity and an outstanding improvement in capacity retaining factor is not therefore expected.

Also, in the case of Comparative Example 3-1 in which the median diameter is 1 μm (1000 nm), the particle diameter of $Al_2O_3$ particles is so large that electroconductivity between the anode active material particles is hindered, resulting in deteriorated cycle characteristics.

It is clarified from this result that a significant effect can be obtained when the median diameter of $Al_2O_3$ to be contained is 100 nm or less, and more significant effect can be obtained when the median diameter of $Al_2O_3$ is 15 nm or less.

Also, in the case of ceramics such as $SiO_2$, $ZrO_2$, MgO, $Na_2O$ and $TiO_2$, other than $Al_2O_3$, the capacity retaining factor can be improved by making the anode contain ceramics having a median diameter less than 1 μm. Particularly, in the case where these ceramics have a median diameter of 100 nm or less, a significant effect can be obtained. Also, in the case where these ceramics have a median diameter of 15 nm or less, a more significant effect can be obtained.

EXAMPLE 4

Using $Al_2O_3$ as the ceramic to be contained in the anode, the thickness or volume density of the anode active material layer formed on the anode current collector was changed and the ceramic was added to produce different lithium ion secondary batteries and the capacity retaining factor of each battery after 100 cycles was measured.

Example 4-1

A lithium ion secondary battery was produced in the same manner as in Example 1-1 except that the thickness of the anode active material layer on one surface was changed to 56 μm.

Example 4-2

A lithium ion secondary battery was produced in the same manner as in Example 1-1 except that the thickness of the anode active material layer on one surface was changed to 60 μm.

Example 4-3

A lithium ion secondary battery was produced in the same manner as in Example 1-1 except that the thickness of the anode active material layer on one surface was changed to 120 μm.

Example 4-4

A lithium ion secondary battery was produced in the same manner as in Example 1-1 except that the thickness of the anode active material layer on one surface was changed to 125 μm.

Example 4-5

A lithium ion secondary battery was produced in the same manner as in Example 1-1 except that the volume density of the anode active material layer was changed to 1.65 g/cm$^3$.

Example 4-6

A lithium ion secondary battery was produced in the same manner as in Example 1-1 except that the volume density of the anode active material layer was changed to 1.70 g/cm$^3$.

Example 4-7

A lithium ion secondary battery was produced in the same manner as in Example 1-1 except that the volume density of the anode active material layer was changed to 1.95 g/cm$^3$.

Example 4-8

A lithium ion secondary battery was produced in the same manner as in Example 1-1 except that the volume density of the anode active material layer was changed to 2.00 g/cm$^3$.

Comparative Example 4-1

A lithium ion secondary battery was produced in the same manner as in Example 1-1 except that the thickness of the anode active material layer on one surface was changed to 56 μm and $Al_2O_3$ was not contained.

Comparative Example 4-2

A lithium ion secondary battery was produced in the same manner as in Example 1-1 except that the thickness of the anode active material layer on one surface was changed to 60 μm and $Al_2O_3$ was not contained.

Comparative Example 4-3

A lithium ion secondary battery was produced in the same manner as in Example 1-1 except that the thickness of the anode active material layer on one surface was changed to 120 μm and $Al_2O_3$ was not contained.

Comparative Example 4-4

A lithium ion secondary battery was produced in the same manner as in Example 1-1 except that the thickness of the anode active material layer on one surface was changed to 125 μm and $Al_2O_3$ was not contained.

Comparative Example 4-5

A lithium ion secondary battery was produced in the same manner as in Example 1-1 except that the volume density of the anode active material layer was changed to 1.65 g/cm$^3$ and $Al_2O_3$ was not contained.

Comparative Example 4-6

A lithium ion secondary battery was produced in the same manner as in Example 1-1 except that the volume density of the anode active material layer was changed to 1.70 g/cm³ and $Al_2O_3$ was not contained.

Comparative Example 4-7

A lithium ion secondary battery was produced in the same manner as in Example 1-1 except that the volume density of the anode active material layer was changed to 1.95 g/cm³ and $Al_2O_3$ was not contained.

Comparative Example 4-8

A lithium ion secondary battery was produced in the same manner as in Example 1-1 except that the volume density of the anode active material layer was changed to 2.00 g/cm³ and $Al_2O_3$ was not contained.

(Measurement of Capacity Retaining Factor)

Each lithium ion secondary battery produced in Examples 4-1 to 4-8 and Comparative Example 4-1 to 4-8 was subjected to charge and discharge operations, to examine its capacity retaining factors in the first cycle and 100th cycle by using the same method that was used in Example 1, to find the capacity retaining factor after 100 cycles.

The capacity retaining factor after 100 cycles in each Example and Comparative Example is shown in Table 4 below.

adding $Al_2O_3$ nano-particles as shown in Table 4, and that a particularly significant effect is obtained when the thickness of the anode active material layer on one surface is 65 µm or more and 120 µm or less.

In the case of Example 4-1 in which the thickness of the anode active material layer was 56 µm and Example 4-4 in which the thickness of the anode active material layer was 125 µm, on the other hand, such a significant effect that was obtained in Examples 4-2 and 4-3 was not observed, though an improvement in capacity retaining factor was found.

This reason is that in Example 4-1, the anode active material layer is so thin that the ability to accept lithium ions is not deteriorated and therefore, though the capacity retaining factor is improved by adding $Al_2O_3$, its effect is weakened, while in Example 4-4, the anode active material layer is so thick that the effect of adding $Al_2O_3$ is insufficiently produced resultantly.

It is found that in the case of Examples 4-5 to 4-8 and Comparative Examples 4-5 to 4-8 each provided with the anode active material layer changed in volume density, the capacity retaining factor can be improved regardless of the volume density of the anode active material layer by adding $Al_2O_3$ nano-particles, and that a particularly significant effect is obtained when the volume density of the anode active material layer is 1.70 g/cm³ or more and 1.95 g/cm³ or less.

In the case of Example 4-5 in which the volume density of the anode active material layer was 1.65 g/cm³ and Example 4-8 in which the volume density of the anode active material layer was 2.00 g/cm³, on the other hand, such a significant effect that was obtained in Examples 4-6 and 4-7 was not observed, though an improvement in capacity retaining factor was observed. This reason is that in Example 4-5, the volume

TABLE 4

| | CERAMIC | | | THICKNESS OF THE COATING FILM | | CAPACITY |
| | TYPE | MEDIAN DIAMETER [nm] | CONTENT [PARTS BY WEIGHT] | ON ONE SURFACE OF THE ANODE [µm] | VOLUME DENSITY OF THE ANODE [g/cm³] | RETAINING FACTOR AFTER 100 CYCLES[%] |
|---|---|---|---|---|---|---|
| EXAMPLE 4-1 | $Al_2O_3$ | 50 | 1.0 | 56 | 1.80 | 92 |
| EXAMPLE 4-2 | $Al_2O_3$ | 50 | 1.0 | 65 | 1.80 | 91 |
| EXAMPLE 4-3 | $Al_2O_3$ | 50 | 1.0 | 120 | 1.80 | 84 |
| EXAMPLE 4-4 | $Al_2O_3$ | 50 | 1.0 | 125 | 1.80 | 61 |
| EXAMPLE 4-5 | $Al_2O_3$ | 50 | 1.0 | 90 | 1.65 | 93 |
| EXAMPLE 4-6 | $Al_2O_3$ | 50 | 1.0 | 90 | 1.70 | 92 |
| EXAMPLE 4-7 | $Al_2O_3$ | 50 | 1.0 | 90 | 1.95 | 85 |
| EXAMPLE 4-8 | $Al_2O_3$ | 50 | 1.0 | 90 | 2.00 | 64 |
| COMPARATIVE EXAMPLE 4-1 | — | — | 0 | 56 | 1.80 | 87 |
| COMPARATIVE EXAMPLE 4-2 | — | — | 0 | 65 | 1.80 | 73 |
| COMPARATIVE EXAMPLE 4-3 | — | — | 0 | 120 | 1.80 | 32 |
| COMPARATIVE EXAMPLE 4-4 | — | — | 0 | 125 | 1.80 | 15 |
| COMPARATIVE EXAMPLE 4-5 | — | — | 0 | 90 | 1.65 | 82 |
| COMPARATIVE EXAMPLE 4-6 | — | — | 0 | 90 | 1.70 | 75 |
| COMPARATIVE EXAMPLE 4-7 | — | — | 0 | 90 | 1.95 | 47 |
| COMPARATIVE EXAMPLE 4-8 | — | — | 0 | 90 | 2.00 | 18 |

It is found that in the case of Examples 4-1 to 4-4 and Comparative Examples 4-1 to 4-4 each provided with the anode active material layer changed in thickness, the capacity retaining factor can be improved regardless of thickness by density of the anode active material layer is so low that the ability to accept lithium ions is not deteriorated and therefore, though the capacity retaining factor is improved by adding $Al_2O_3$, its effect is weakened, while in Example 4-8, the volume density of the anode active material layer is so high that the effect of adding $Al_2O_3$ is insufficiently produced resultantly.

In the case of containing $Al_2O_3$ nano-particles, it is clarified from this result that the effect of improving the capacity retaining factor can be obtained particularly significantly when the thickness of the anode active material layer on one surface is designed to be 65 μm or more and 120 μm or less and the volume density of the anode active material layer is designed to be 1.70 g/cm$^3$ or more and 1.95 g/cm$^3$ or less.

Also, in the case of containing ceramics such as $SiO_2$, $ZrO_2$, MgO, $Na_2O$ and $TiO_2$, other than $Al_2O_3$, the capacity retaining factor can be remarkably improved and a high effect can be obtained by making the anode active material layer have a thickness of 65 μm or more and 120 μm or less on one surface and a volume density of 1.70 g/cm$^3$ or more and 1.95 g/cm$^3$ or less.

Although the present application has been described in its preferred form, the present application is not limited to the above embodiment. It should be understood by those skilled in the art that various modifications, combinations, sub-combinations and alternations may occur depending on design requirements and other factors insofar as they are within the scope of the appended claims or the equivalents thereof.

For example, the values given in the above embodiment are only examples and values different from the above values may be used according to the need.

Also, in the above embodiment, explanations are furnished as to the application to a cylindrical battery using an electrolyte solution. However, the present application may be applied to any battery insofar as it uses a carbon material for the anode and it charges or discharges by occluding or releasing lithium ions. Though the present application may be applied to a battery using a gel electrolyte, the effect can be obtained when it is applied to batteries using an electrolyte solution.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A lithium ion battery comprising:
    a cathode;
    an anode having an anode active material layer provided on an anode current collector, said anode active material layer containing a carbon material as an anode active material; and
    an electrolyte solution,
    wherein the anode active material layer contains nano-particles of ceramic,
    the median diameter of the ceramic is 100 nm or less, and
    the content of the ceramic is 0.1 parts by weight or more and 2.0 parts by weight or less for 100 parts by weight of the anode active material.

2. The lithium ion battery according to claim 1, wherein the ceramic is at least one kind selected from the group consisting of $Al_2O_3$, $SiO_2$, $ZrO_2$, MgO, $Na_2O$ and $TiO_2$.

3. The lithium ion battery according to claim 1, wherein the ceramic is $Al_2O_3$.

4. The lithium ion battery according to claim 1, wherein the median diameter of the ceramic is 15 nm or less.

5. The lithium ion battery according to claim 1, wherein the thickness of the anode active material layer provided on one surface of the anode current collector is 65 μm or more and 120 μm or less.

6. The lithium ion battery according to claim 1, wherein the volume density of the anode active material layer is 1.70 g/cm$^3$ or more and 1.95 g/cm$^3$ or less.

7. The lithium ion battery according to claim 1, wherein the carbon material is composed of mesophase spherules.

* * * * *